(12) United States Patent
Li (10) Patent No.: US 7,820,067 B2
(45) Date of Patent: Oct. 26, 2010

(54) HALIDE ANIONS FOR METAL REMOVAL RATE CONTROL

(75) Inventor: Shoutian Li, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 11/388,085

(22) Filed: Mar. 23, 2006

(65) Prior Publication Data

US 2007/0224822 A1 Sep. 27, 2007

(51) Int. Cl.
*C09K 13/00* (2006.01)

(52) U.S. Cl. ............................. 252/79.1; 51/307; 106/3

(58) Field of Classification Search ................ 252/79.1; 51/307; 106/3; 156/345.12
See application file for complete search history.

(56) References Cited

U.S. PATENT DOCUMENTS

| | | | |
|---|---|---|---|
| 5,196,353 A | 3/1993 | Sandhu et al. | |
| 5,433,651 A | 7/1995 | Lustig et al. | |
| 5,609,511 A | 3/1997 | Moriyama et al. | |
| 5,643,046 A | 7/1997 | Katakabe et al. | |
| 5,658,183 A | 8/1997 | Sandhu et al. | |
| 5,730,642 A | 3/1998 | Sandhu et al. | |
| 5,838,447 A | 11/1998 | Hiyama et al. | |
| 5,872,633 A | 2/1999 | Holzapfel et al. | |
| 5,893,796 A | 4/1999 | Birang et al. | |
| 5,949,927 A | 9/1999 | Tang | |
| 5,964,643 A | 10/1999 | Birang et al. | |
| 6,294,027 B1 | 9/2001 | Li et al. | |
| 6,294,072 B1 | 9/2001 | Fairbourn | |
| 6,315,803 B1 | 11/2001 | Ina et al. | |
| 6,316,366 B1 | 11/2001 | Kaufman et al. | |
| 6,362,104 B1 | 3/2002 | Wang et al. | |
| 6,435,947 B2 | 8/2002 | Mueller et al. | |
| 6,447,563 B1 | 9/2002 | Mahulikar | |
| 6,582,761 B1 | 6/2003 | Nishimoto et al. | |
| 6,635,186 B1 | 10/2003 | Small et al. | |
| 6,641,630 B1 * | 11/2003 | Sun ............................. 51/307 |
| 6,719,920 B2 | 4/2004 | Miller | |
| 6,783,432 B2 | 8/2004 | Li et al. | |
| 6,812,193 B2 | 11/2004 | Brigham et al. | |
| 6,821,309 B2 | 11/2004 | Singh et al. | |
| 6,852,631 B2 | 2/2005 | Miller | |
| 7,014,534 B2 * | 3/2006 | Oshima et al. ................. 451/41 |
| 2002/0104269 A1 | 8/2002 | Sun et al. | |
| 2003/0017785 A1 | 1/2003 | Ueda et al. | |
| 2003/0168627 A1* | 9/2003 | Singh et al. ................. 252/79.1 |
| 2005/0097825 A1* | 5/2005 | Bian ........................... 51/307 |
| 2005/0104048 A1* | 5/2005 | Thomas et al. .............. 252/515 |
| 2006/0030158 A1* | 2/2006 | Carter et al. ................. 438/692 |
| 2006/0037251 A1* | 2/2006 | Kurata et al. .................. 51/298 |

* cited by examiner

*Primary Examiner*—Shamim Ahmed
(74) *Attorney, Agent, or Firm*—Thomas E. Omholt; Nancy J. Gettel; Steven D. Weseman (57) ABSTRACT

The inventive chemical-mechanical polishing system comprises a polishing component, a liquid carrier, an oxidizing agent, and a halogen anion. The inventive method comprises chemically-mechanically polishing a substrate with the polishing system.

12 Claims, 4 Drawing Sheets

HALIDE ANIONS FOR METAL REMOVAL RATE CONTROL

FIELD OF THE INVENTION

This invention pertains to a polishing composition and a method for polishing a substrate using the same.

BACKGROUND OF THE INVENTION

Compositions, systems, and methods for planarizing or polishing the surface of a substrate, especially for chemical-mechanical polishing (CMP), are well known in the art. Polishing compositions (also known as polishing slurries) typically contain an abrasive material in an aqueous solution and are applied to a surface by contacting the surface with a polishing pad saturated with the polishing composition. When used for polishing substrates comprising metals, the polishing compositions often comprise an oxidizing agent. The purpose of the oxidizing agent is to convert the surface of the metals into a softer, more readily abradable material than the metal itself. Thus, polishing compositions comprising oxidizing agents in conjunction with abrasives generally require less aggressive mechanical abrasion of the substrate, which reduces mechanical damage to the substrate caused by the abrading process. Additionally, the presence of the oxidizing agent frequently increases removal rates for the metals and increases throughput in a production setting.

Development of the next generation of semiconductor devices has emphasized the use of metals with lower resistivity values, such as copper, than previous generation metals such as aluminum in order to reduce capacitance between conductive layers on the devices and to increase the frequency at which a circuit can operate. One way to fabricate planar copper circuit traces on a silicon dioxide substrate is referred to as the damascene process. In accordance with this process, the silicon dioxide dielectric surface is patterned by a conventional dry etch process to form holes and trenches for vertical and horizontal interconnects. The patterned surface is coated with an adhesion-promoting layer such as tantalum or titanium and/or a diffusion barrier layer such as tantalum nitride or titanium nitride. The adhesion-promoting layer and/or the diffusion barrier layer are then over-coated with a copper layer. Chemical-mechanical polishing is employed to reduce the thickness of the copper over-layer, as well as the thickness of any adhesion-promoting layer and/or diffusion barrier layer, until a planar surface that exposes elevated portions of the silicon dioxide surface is obtained. The vias and trenches remain filled with electrically conductive copper forming the circuit interconnects.

The polishing of a substrate containing both tantalum and copper layers typically requires the addition of a traditional copper inhibitor, such as benezotriazole (BTA) or methyl-benezotriazole (m-BTA), to the polishing slurry in order to limit the removal rate of the copper layer. The polishing of tantalum layers typically requires an oxidizing agent to achieve useful removal rates, such as a peroxide (e.g., hydrogen peroxide) or potassium iodate. Tantalum layers are typically polished at a high pH. However, the rate of copper removal remains high even for slurries having a low pH and which contain an oxidizer such as hydrogen peroxide or potassium iodate. Further, peroxide is a strong oxidizing agent that can react with other components of polishing compositions, which limits the stability of the polishing compositions and thus their useful pot-life. For example, hydrogen peroxide degrades BTA, in addition to contributing to eroding the copper lines on the substrate surface by chemical etching.

Thus, there remains a need for alternative polishing systems and methods of polishing for substrates comprising tantalum and copper.

BRIEF SUMMARY OF THE INVENTION

The invention provides a chemical-mechanical polishing system for polishing a substrate. The system comprises (a) a polishing component selected from the group consisting of a polishing pad, an abrasive, and a combination thereof, (b) a liquid carrier, (c) an oxidizing agent that oxidizes at least part of a substrate, wherein the oxidizing agent is present in an amount of about 0.5 wt. % or less based on the weight of the liquid carrier and any components dissolved or suspended therein, and (d) a halogen anion selected from the group consisting of chloride, bromide, and a combination thereof, wherein the liquid carrier with any components dissolved or suspended therein has a pH of about 3 or less.

The invention also provides a method of chemically-mechanically polishing a substrate. The method comprises (i) contacting a substrate with a chemical-mechanical polishing system comprising (a) a polishing component selected from the group consisting of a polishing pad, an abrasive, and a combination thereof, (b) a liquid carrier, (c) an oxidizing agent that oxidizes at least part of a substrate, wherein the oxidizing agent is present in an amount of about 0.5 wt. % or less based on the weight of the liquid carrier and any components dissolved or suspended therein, and (d) a halogen anion selected from the group consisting of chloride, bromide, and a combination thereof, wherein the liquid carrier with any components dissolved or suspended therein has a pH of about 3 or less, (ii) moving the polishing component relative to the substrate, and (iii) abrading at least a portion of the substrate to polish the substrate, wherein the liquid carrier with any components dissolved or suspended therein has a pH of about 3 or less.

DETAILED DESCRIPTION OF THE INVENTION

The invention provides a chemical-mechanical polishing system for polishing a substrate. The system comprises, consists of, or consists essentially of (a) a polishing component selected from the group consisting of a polishing pad, an abrasive, and a combination thereof, (b) a liquid carrier, (c) an oxidizing agent that oxidizes at least part of a substrate, wherein the oxidizing agent is present in an amount of about 0.5 wt. % or less based on the weight of the liquid carrier and any components dissolved or suspended therein, and (d) a halogen anion selected from the group consisting of chloride, bromide, and a combination thereof, wherein the liquid carrier with any components dissolved or suspended therein has a pH of about 3 or less. The liquid carrier, oxidizing agent, halogen anion, and any other component dissolved or suspended in the liquid carrier (e.g., an abrasive) constitute the polishing composition. The amounts of components described herein are based on the total weight of the polishing composition unless otherwise specified herein.

The substrate to be polished can be any suitable substrate. Suitable substrates include, but are not limited to, integrated circuits, memory or rigid disks, metals, interlayer dielectric (ILD) devices, semiconductors, micro-electro-mechanical components, ferroelectrics, and magnetic heads. The substrate can comprise a metal layer. The metal layer can comprise any suitable metal. For example, the metal layer can comprise copper, tantalum (e.g., tantalum nitride), titanium, aluminum, nickel, platinum, ruthenium, iridium, or rhodium. The substrate can further comprise at least one other layer, e.g., an insulating layer. The insulating layer can be a metal oxide, porous metal oxide, glass, organic polymer, fluorinated organic polymer, or any other suitable high or low-κ insulating layer. The metal layer can be disposed on the other layer. More preferably, the substrate has at least one layer of tantalum and at least one layer of copper.

The polishing component can comprise, consist of, or consist essentially of a polishing pad (e.g., polishing surface). The polishing pad can be any suitable polishing pad, many of which are known in the art. Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

The polishing pad can comprise fixed abrasive particles on or within the polishing surface of the polishing pad, or the polishing pad can be substantially free of fixed abrasive particles. Fixed abrasive polishing pads include pads having abrasive particles affixed to the polishing surface of the polishing pad by way of an adhesive, binder, ceramer, resin, or the like or abrasives that have been impregnated within a polishing pad so as to form an integral part of the polishing pad, such as, for example, a fibrous batt impregnated with an abrasive-containing polyurethane dispersion. Fixed abrasive pads can eliminate the need for providing an abrasive component in the polishing composition.

The polishing pad can have any suitable configuration. For example, the polishing pad can be circular and, when in use, typically will have a rotational motion about an axis perpendicular to the plane defined by the surface of the pad. The polishing pad can be cylindrical, the surface of which acts as the polishing surface, and, when in use, typically will have a rotational motion about the central axis of the cylinder. The polishing pad can be in the form of an endless belt, which when in use typically will have a linear motion with respect to the cutting edge being polished. The polishing pad can have any suitable shape and, when in use, have a reciprocating or orbital motion along a plane or a semicircle. Many other variations will be readily apparent to the skilled artisan.

The polishing component can comprise an abrasive, which can be fixed to the polishing pad as described above or can be suspended in the liquid carrier (e.g., water). The abrasive can be in any suitable form (e.g., abrasive particles). The abrasive typically is in particulate form and is suspended in the liquid carrier (e.g., water). The abrasive can be any suitable abrasive. For example, the abrasive can be natural or synthetic, and can comprise, consist essentially of, or consist of metal oxide, carbide, nitride, carborundum, or the like. The abrasive also can be a polymer particle or a coated particle. The abrasive typically comprises metal oxide particles. Preferably, the abrasive is a metal oxide selected from the group consisting of alumina, ceria, silica, zirconia, co-formed products thereof, and combinations thereof. The abrasive particles typically have an average particle size (e.g., average particle diameter) of about 20 nm to about 500 nm. Preferably, the abrasive particles have an average particle size of about 20 nm to about 300 nm (e.g., about 70 nm to about 300 mm, or about 100 nm to about 200 nm). Any suitable amount of abrasive can be present in the polishing composition. Typically, about 0.01 wt. % or more (e.g., about 0.05 wt. % or more) abrasive will be present in the polishing composition. More typically, about 0.1 wt. % or more abrasive will be present in the polishing composition. The amount of abrasive in the polishing composition typically will not exceed about 20 wt. %, more typically will not exceed about 15 wt. % (e.g., will not exceed about 10 wt. %). Preferably, the amount of abrasive in the polishing composition is about 0.1 wt. % to about 10 wt. %, and more preferably about 0.5 wt. % or less. The use of such a low concentration of abrasive significantly reduces manufacturing costs of the polishing composition and reduces the likelihood of scratching or otherwise producing a defective substrate.

A liquid carrier is used to facilitate the application of the abrasive (when present and suspended in the liquid carrier), oxidizing agent, halogen anion, and any optional additives to the surface of a suitable substrate to be polished (e.g., planarized). The liquid carrier can be any suitable solvent including lower alcohols (e.g., methanol, ethanol, etc.), ethers (e.g., dioxane, tetrahydrofuran, etc.), water, and mixtures thereof. Preferably, the liquid carrier comprises, consists essentially of, or consists of water, more preferably deionized water.

The oxidizing agent can be any suitable oxidizing agent. Preferably, the oxidizing agent is selected from the group consisting of bromates, bromites, chlorates, chlorites, hydrogen peroxide, hypochlorites, iodates, monoperoxy sulfate, monoperoxy sulfite, monoperoxyphosphate, monoperoxyhypophosphate, monoperoxypyrophosphate, organo-halo-oxy compounds, periodates, permanganate, peroxyacetic acid, and mixtures thereof. More preferably, the oxidizing agent is hydrogen peroxide, potassium iodate, or a combination thereof.

The oxidizing agent is present in the polishing composition in an amount of about 0.5 wt. % or less. Typically, the polishing composition comprises about 0.1 wt. % or more (e.g., about 0.2 wt. % or more) oxidizing agent. The polishing composition preferably comprises about 0.45 wt. % or less (e.g., about 0.4 wt. % or less, or about 0.3 wt. % or less) oxidizing agent. Even more preferably, the oxidizing agent is present in the polishing composition in an amount of about 0.2 wt. % or less. Unexpectedly, the copper removal rate exhibited by the polishing system was successfully reduced without significant reduction in the rate of tantalum removal using a relatively low concentration of oxidizer.

The halogen anion can be generated by any source. Preferably, the source is selected from the group consisting of an acid chloride or bromide, an alkali metal chloride or bromide, a Group IIIA chloride or bromide, an ammonium or ammonium derivative of a chloride or bromide salt, a transition metal chloride or bromide, and combinations thereof. More preferably, the source is selected from the group consisting of hydrogen chloride, magnesium chloride, calcium chloride, strontium chloride, barium chloride, potassium chloride, cesium chloride, lithium chloride, sodium chloride, rubidium chloride, tetrabutyl ammonium chloride, tetramethyl ammonium chloride, tetraethyl ammonium chloride, tetrapropyl ammonium chloride, alkylbenzyldimethylammonium chloride wherein the alkyl is a $C_1$-$C_{20}$ alkyl, aluminum chloride, gallium chloride, indium chloride, thallium chloride, zinc chloride, copper chloride, ferric chloride, ferrous chloride, tetrabutyl ammonium bromide, tetramethyl ammonium bromide, tetraethyl ammonium bromide, tetrapropyl ammonium bromide, alkylbenzyldimethylammonium bromide wherein the alkyl is a $C_1$-$C_{20}$ alkyl, hydrogen bromide, cesium bromide, lithium bromide, potassium bromide, rubidium bromide, sodium bromide, magnesium bromide, calcium bromide, strontium bromide, barium bromide, aluminum bromide, gallium bromide, indium bromide, thallium bromide, zinc bromide, copper bromide, ferric bromide, ferrous bromide, and combinations thereof.

The halogen anion can have any suitable concentration in the polishing composition. Typically, the concentration of the halogen anion is from about 0.5 mM to about 50 mM in the polishing composition. The concentration of the halogen anion in the polishing composition preferably is about 7 mM or less, and more preferably is about 2 mM or less (e.g., about 1.5 mM or less, or about 1 mM or less). The concentration of the halogen anion in the polishing composition preferably is about 0.1 mM or more, and more preferably is about 0.2 mM or more (e.g., about 0.3 mM or more, or about 0.4 mM or more).

The liquid carrier with any components dissolved or suspended therein can have any suitable pH. The actual pH of the polishing composition will depend, in part, on the type of substrate being polished. The polishing composition has a pH of about 3 or less (e.g., about 2.2 or less, or about 2 or less). Typically, the polishing composition has a pH of about 1 or more (e.g., about 1 to about 3, about 1 to about 2.2, or about 1 to about 2).

The pH of the polishing composition can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be any suitable acid, such as an inorganic acid, an organic acid, or combination thereof. For example, the acid can be nitric acid. The pH buffering agent can be any suitable buffering agent, for example, phosphates, acetates, borates, sulfonates, carboxylates, ammonium salts, and the like. The polishing composition can comprise any suitable amount of a pH adjustor and/or a pH buffering agent, provided such amount is sufficient to achieve and/or maintain the desired pH of the polishing composition, e.g., within the ranges set forth herein. More preferably, the pH of the polishing composition can be adjusted and/or maintained using the halogen anion source described above.

The polishing composition can comprise a corrosion inhibitor (i.e., a film-forming agent). The corrosion inhibitor can be any suitable corrosion inhibitor. Typically, the corrosion inhibitor is an organic compound containing a heteroatom-containing functional group. For example, the corrosion inhibitor can be a heterocyclic organic compound with at least one 5- or 6-member heterocyclic ring as the active functional group, wherein the heterocyclic ring contains at least one nitrogen atom, for example, an azole compound. Preferably, the corrosion inhibitor contains at least one azole group. More preferably, the corrosion inhibitor is selected from the group consisting of 1,2,3-triazole, 1,2,4-triazole, benzotriazole, benzimidazole, benzothiazole, and mixtures thereof. The amount of corrosion inhibitor in the polishing composition typically is about 0.0001 wt. % to about 3 wt. % (preferably about 0.001 wt. % to about 2 wt. %).

The polishing composition can comprise a chelating or complexing agent. The complexing agent is any suitable chemical additive that enhances the removal rate of the substrate layer being removed. Suitable chelating or complexing agents can include, for example, carbonyl compounds (e.g., acetylacetonates and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), mixtures thereof, and the like), carboxylates containing one or more sulfonic and/or phosphonic groups, and the like. Suitable chelating or complexing agents also can include, for example, di-, tri-, or polyalcohols (e.g., ethylene glycol, pyrocatechol, pyrogallol, tannic acid, and the like) and amine-containing compounds (e.g., ammonia, amino acids, amino alcohols, di-, tri-, and polyamines, and the like). The choice of chelating or complexing agent will depend on the type of substrate layer being removed.

It will be appreciated that many of the aforementioned compounds can exist in the form of a salt (e.g., a metal salt, an ammonium salt, or the like), an acid, or as a partial salt. For example, citrates include citric acid, as well as mono-, di-, and tri-salts thereof, phthalates include phthalic acid, as well as mono-salts (e.g., potassium hydrogen phthalate) and di-salts thereof, perchlorates include the corresponding acid (i.e., perchloric acid), as well as salts thereof. Furthermore, certain compounds or reagents may perform more than one function. For example, some compounds can function both as a chelating agent and an oxidizing agent (e.g., certain ferric nitrates and the like).

The polishing composition optionally further comprises one or more other additives. Such additives include acrylates comprising one or more acrylic subunits (e.g., vinyl acrylates and styrene acrylates), and polymers, copolymers, and oligomers thereof, and salts thereof.

The polishing composition can comprise a surfactant and/or rheological control agent, including viscosity enhancing agents and coagulants (e.g., polymeric rheological control agents, such as, for example, urethane polymers). Suitable surfactants can include, for example, cationic surfactants, anionic surfactants, nonionic surfactants, amphoteric surfactants, mixtures thereof, and the like. Preferably, the polishing composition comprises a nonionic surfactant. One example of a suitable nonionic surfactant is an ethylenediamine polyoxyethylene surfactant. The amount of surfactant in the polishing composition typically is about 0.0001 wt. % to about 1 wt. % (preferably about 0.001 wt. % to about 0.1 wt. % and more preferably about 0.005 wt. % to about 0.05 wt. %).

The polishing composition can comprise an antifoaming agent. The antifoaming agent can be any suitable anti-foaming agent. Suitable antifoaming agents include, but are not limited to, silicon-based and acetylenic diol-based antifoaming agents. The amount of anti-foaming agent in the polishing composition typically is about 10 ppm to about 140 ppm.

The polishing composition can comprise a biocide. The biocide can be any suitable biocide, for example an isothiazolinone biocide. The amount of biocide in the polishing composition typically is about 1 to about 50 ppm, preferably about 10 to about 20 ppm.

The polishing composition preferably is colloidally stable. The term colloid refers to the suspension of the particles in the liquid carrier. Colloidal stability refers to the maintenance of that suspension through time. A polishing composition is considered colloidally stable if, when the polishing composition is placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the polishing composition ([C] in terms of g/ml) is less than or equal to 0.5 (i.e., $\{[B]-[T]\}/[C] \leqq 0.5$). Preferably, the value of $[B]-[T]/[C]$ is less than or equal to 0.3, more preferably is less than or equal to 0.1, even more preferably is less than or equal to 0.05, and most preferably is less than or equal to 0.01.

The polishing composition can be prepared by any suitable technique, many of which are known to those skilled in the art. The polishing composition can be prepared in a batch or continuous process. Generally, the polishing composition can be prepared by combining the components thereof in any order. The term "component" as used herein includes individual ingredients (e.g., oxidizing agent, abrasive, etc.) as well as any combination of ingredients (e.g., liquid carrier, halogen anion, surfactants, etc.).

The polishing composition can be supplied as a one-package system comprising an oxidizing agent, a halogen anion, a liquid carrier, and optionally an abrasive. Alternatively, the oxidizing agent can be supplied in a first container, either in dry form, or as a solution or dispersion in the liquid carrier, and the halogen anion, the liquid carrier, and optionally the abrasive and other additives, can be supplied in a second container. The use of a stable oxidizing agent, such as potassium iodate, allows the oxidizing agent to be supplied in a container with other components of the polishing composition, since it is less likely to react with the other components. This approach can substantially reduce the cost of preparing and using the polishing composition.

Optional components, such as an abrasive, can be placed in the first and/or second containers or in a third container, either in dry form, or as a solution in the liquid carrier. Moreover, it is suitable for the components in the first or second containers to have different pH values, or alternatively to have substantially similar, or even equal, pH values. If an optional component is a solid, it may be supplied either in dry form or as a mixture in the liquid carrier. The optional components can be supplied separately from the other components of the polishing system and can be combined, e.g., by the end-user, with the other components of the polishing composition shortly before use (e.g., 1 week or less prior to use, 1 day or less prior to use, 1 hour or less prior to use, 10 minutes or less prior to use, or 1 minute or less prior to use). Other two-container, or three or more container combinations of the components of the polishing composition are within the knowledge of one of ordinary skill in the art.

The polishing composition also can be provided as a concentrate which is intended to be diluted with an appropriate amount of liquid carrier prior to use. In such an embodiment, the polishing composition concentrate can comprise an oxidizing agent, a halogen anion, and a liquid carrier in amounts such that, upon dilution of the concentrate with an appropriate amount of liquid carrier, each component will be present in the polishing composition in an amount within the appropriate range recited above for each component. For example, the oxidizing agent can each be present in the concentrate in an amount that is about 2 times (e.g., about 3 times, about 4 times, or about 5 times) greater than the concentration recited above for each component in the polishing composition so that, when the concentrate is diluted with an appropriate volume of liquid carrier (e.g., 2 equal volumes of liquid carrier, 3 equal volumes of liquid carrier, or 4 equal volumes of liquid carrier, respectively), each component will be present in the polishing composition in an amount within the ranges set forth above for each component. Furthermore, as will be understood by those of ordinary skill in the art, the concentrate can contain an appropriate fraction of the liquid carrier present in the final polishing composition in order to ensure that the oxidizing agent, halogen anion, and other suitable additives, such as an abrasive, are at least partially or fully dissolved or suspended in the concentrate.

The invention also provides a method of chemically-mechanically polishing a substrate. The method comprises (i) contacting a substrate with a chemical-mechanical polishing system as described herein, (ii) moving the polishing component relative to the substrate, and (iii) abrading at least a portion of the substrate to polish the substrate.

The inventive method of polishing a substrate is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the chemical-mechanical polishing composition of the invention, with the polishing pad moving relative to the substrate, so as to abrade at least a portion of the substrate to polish the substrate.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643.

Polishing refers to the removal of at least a portion of a surface to polish the surface. Polishing can be performed to provide a surface having reduced surface roughness by removing gouges, crates, pits, and the like, but polishing also can be performed to introduce or restore a surface geometry characterized by an intersection of planar segments. For example, where two surfaces intersect to define an edge, polishing of at least one of the surfaces by abrading at least a portion of the surface results in an alteration of the geometry of the edge. In embodiments wherein the one or more surfaces define an edge that is used in a cutting operation (e.g., in polishing of cutting tools), polishing of the surface can result in a redefinition or resharpening of the edge.

As previously discussed, the substrate preferably has at least one layer of tantalum and at least one layer of copper. The copper layer desirably is removed from the substrate at a rate of about 1000 Å/min or less (e.g., about 800 Å/min or less, about 500 Å/min or less, or about 300 Å/min or less). Unexpectedly, the presence of halogen anions, such as chloride or bromide, effectively reduced the rate of copper removal without substantially reducing the rate of tantalum removal, which allows polishing of the substrate to occur in a single, rather than a multi-step, process. This is a significant improvement over the use of traditional copper inhibitors, such as BTA and m-BTA, which are relatively ineffective in reducing the rate of copper removal and can be easily degraded by other components of the polishing system, such as hydrogen peroxide. Without wishing to be bound by any particular theory, it is possible that the low solubility of CuCl or CuBr lead to preferential adsorption of the chloride or bromide anions on $Cu^+$ sites, thus preventing continuous copper oxidation by the oxidizing agent.

The following examples further illustrate the invention but, of course, should not be construed as in any way limiting its scope.

EXAMPLE 1

This example illustrates the effect on the removal rate of copper by the presence of chloride anions and other substrates in a polishing composition containing silica and an oxidizing agent.

Eight different polishing compositions were evaluated with respect to copper removal rate. Each composition comprised water, 0.5 wt. % condensation-polymerized silica (25 nm diameter), and 0.2 wt. % $KIO_3$, and was adjusted to a pH of 2.2 with nitric acid (the base composition). Additional components were added to the base composition to form other compositions. In particular, the other compositions further comprised 300 ppm HCl and a pH adjuster, 10 mM BTA, 20 mM BTA, 10 mM m-BTA, 5 mM m-BTA, 800 ppm $H_3PO_4$ and a pH adjuster, and 0.5 wt. % KCl, respectively.

A substrate containing a layer of copper was polished with each of the compositions using a Logitech polisher with a soft Politex pad. The Logitech polisher was set with a 10.3 kPa (1.5 psi) down force, a platen speed of 110 rpm, a carrier speed of 102 rpm, and a composition flow rate of 150 ml/min.

Figure 1:
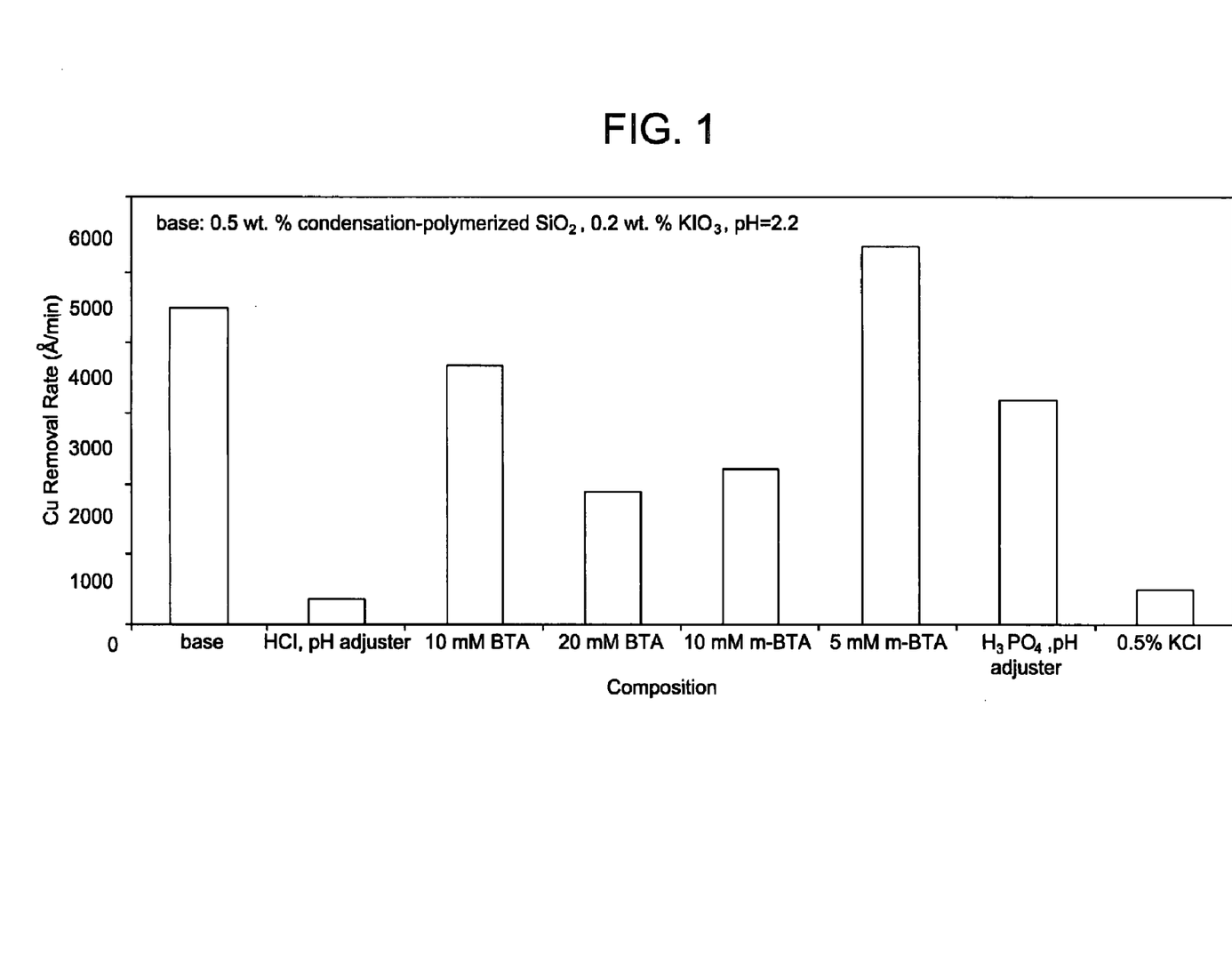
FIG. 1 is a graph of copper removal rate (Å/min) versus various compositions at low pH.

The copper removal rate (Å/min) was determined for each composition, and the results are plotted in the bar graph of FIG. 1.

As is apparent from the data set forth in FIG. 1, the base composition had a high copper removal rate. The inventive compositions containing chloride ions exhibited a rate of copper removal that was approximately ten times lower than the rate of the base composition. In contrast, the comparative compositions containing BTA, m-BTA, or $H_3PO_4$ exhibited higher copper removal rates than the inventive compositions containing chloride ions.

EXAMPLE 2

This example illustrates the effect on the removal rates of copper and tantalum by the presence of halogen anions in a polishing composition containing silica and an oxidizing agent.

Various polishing compositions were evaluated with respect to copper and tantalum removal rates. Each composition comprised water, 0.5 wt. % condensation-polymerized silica (25 nm diameter), and 0.2 wt. % $KIO_3$, and was adjusted to a pH of 2.2 with nitric acid (the base composition). The compositions differed from each other by the presence of different concentrations of potassium fluoride, potassium chloride, potassium bromide, or potassium iodide.

A substrate containing a layer of copper and a layer of tantalum was polished with each of the compositions using a Logitech polisher with a soft Politex pad. The Logitech polisher was set with a 10.3 kPa (1.5 psi) down force, a platen speed of 110 rpm, a carrier speed of 102 rpm, and a composition flow rate of 150 ml/min. The salt solutions of KF, KCl, KBr, and KI were mixed into the base composition at the indicated concentrations through an in-line mixing system that was built into the Logitech polisher.

The copper and tantalum removal rates (Å/min) were determined for each composition. The salt type, salt concentration, and polishing results are set forth in Tables 1 and 2.

TABLE 1

Copper Removal Rate (Å/min)

| Salt | Salt Concentration | | | | |
|---|---|---|---|---|---|
| | 0 ppm | 66 ppm | 132 ppm | 476 ppm | 909 ppm |
| KF | 3023 | 2775 | 2702 | 2140 | 1888 |
| KCl | 3023 | 1047 | 473 | 302 | 266 |
| KBr | 3023 | 319 | 360 | 274 | 318 |
| KI | 3023 | 3039[1] | 1896[2] | 1583[3] | N/A |

[1] at 110 ppm;
[2] at 218 ppm;
[3] at 535 ppm

TABLE 2

Tantalum Removal Rate (Å/min)

| Salt | Salt Concentration | | | | |
|---|---|---|---|---|---|
| | 0 ppm | 66 ppm | 132 ppm | 476 ppm | 909 ppm |
| KF | 315 | 358 | 512 | 410 | 362 |
| KCl | 315 | 365 | 459 | 421 | 406 |
| KBr | 315 | 341 | 343 | 371 | 370 |

As is apparent from the data set forth in Table 1, at a concentration of 132 ppm, the presence of KCl and KBr reduced the copper removal rate from about 3000 Å/min to below 500 Å/min. Moreover, the presence of only 66 ppm KBr was required in order to reduce the copper removal rate to below 400 Å/min. The data set forth in Table 1 also demonstrate that the presence of KF and KI was not effective in reducing the copper removal rate. As is apparent from the data set forth in Table 2, the presence of chloride and bromide did not reduce the tantalum removal rate. Rather, at a concentration of about 132 ppm, the presence of KCl and KBr boosted the rate of tantalum removal by 46% and 9%, respectively, as compared with the base composition.

EXAMPLE 3

This example compares the effect on the removal rate of copper by the presence of various compounds in a polishing composition containing silica and an oxidizing agent.

Various polishing compositions were evaluated with respect to copper removal rate. Each composition comprised water, 0.5 wt. % condensation-polymerized silica (25 nm diameter), and 0.2 wt. % $KIO_3$, and was adjusted to a pH of 2.2 with nitric acid (the base composition). The compositions differed from each other by the presence of different concentrations of BTA, KBr, NaBr, KCl, CsCl, HCl, tetrabutylammonium chloride (TBACl), KI, $KNO_3$, KAc, $K_2SO_4$, $K_2CO_3$, or $K_3PO_4$.

A substrate containing a layer of copper was polished with each of the compositions using a Logitech polisher with a soft Politex pad. The Logitech polisher was set with a 9.3 kPa (1.35 psi) down force, a platen speed of 110 rpm, a carrier speed of 102 rpm, and a composition flow rate of 150 ml/min. The dilute salt solutions were mixed into the base composition through an in-line mixing system that was built into the Logitech polisher.

The copper removal rate (Å/min) was determined for each composition. The additive type, additive concentration, and polishing results are set forth in Table 3.

TABLE 3

Copper Removal Rate (Å/min)

| Additive | Additive Concentration | | | |
|---|---|---|---|---|
| | 0 mM | 0.66 mM | 1.32 mM | 6.25 mM |
| BTA | 4384 | 5123 | 5560 | 5783 |
| KBr | 4384 | 575 | 629 | 266 |
| NaBr | 4384 | 350 | 398 | 228 |
| KCl | 4384 | 404 | 356 | 337 |
| CsCl | 4384 | 411 | 355 | 386 |
| HCl | 4384 | 449 | 398 | 346 |
| TBACl | 4384 | 863[1] | 502[2] | 411[3] |
| KI | 4384 | 3039 | 1896 | 2824 |
| KNO$_3$ | 4384 | — | 2255 | 4281 |
| KAc | 4384 | 4752 | 4967 | — |
| K$_2$SO$_4$ | 4384 | 3701 | 4155 | 3960 |
| K$_2$CO$_3$ | 4384 | 2644 | 2599 | — |
| K$_3$PO$_4$ | 4384 | 2712 | 3353 | — |

[1] at 0.58 mM;
[2] at 1.13 mM;
[3] at 1.64 mM

As is apparent from the data set forth in Table 3, the base composition had a copper removal rate of 4384 Å/min. The copper removal rate was not reduced by the presence of BTA. The presence of nitrate, acetate, carbonate, sulfate, and phosphate anions did not lower the copper removal rate below 1000 Å/min. The presence of bromide and chloride anions, however, reduced the copper removal rate to below 1000 Å/min. The type of cation was not a significant factor as regards the copper removal rate.

EXAMPLE 4

This example illustrates the effect on the removal rates of copper and tantalum by the presence of various additives in polishing compositions comprising cerium-stabilized silica and iodate.

Nine different polishing compositions were evaluated with respect to copper and tantalum removal rates. Each composition comprised water, 0.5 wt. % cerium (IV)-stabilized condensation-polymerized silica (28 nm diameter, 500 ppm Ce (IV)), and 0.20 wt. % KIO$_3$ oxidizer at a pH of 2.1±0.1 (the base composition). The base composition was made in two batches that formed Compositions A and F. 1,2,4-triazole (TAZ), CsCl, BTA, Cs$_2$CO$_3$, KCl, and combinations thereof were added to the two batches of the base composition as indicated in Table 4 to form Composition B-E and G-I.

A substrate containing a layer of copper and a layer of tantalum was polished using a CETR polisher with an A110 hard pad. The CETR polisher was set with a 10.3 kPa (1.5 psi) down force, a platen speed of 133 rpm, a carrier speed of 120 rpm, and a composition flow rate of 60 ml/min.

The copper and tantalum removal rates (Å/min) were determined for each composition, and the results are set forth in Table 4.

TABLE 4

Copper and Tantalum Removal Rates (Å/min)

| Polishing Composition | Additive | Copper Removal Rate (Å/min) | Tantalum Removal Rate (Å/min) |
|---|---|---|---|
| A (control) | Base composition (batch 1) | 2229 | 208 |
| B (comparative) | Batch 1 + 400 ppm TAZ | 3337 | 297 |
| C (inventive) | Batch 1 + 400 ppm TAZ + 0.5 wt. % CsCl | 325 | 247 |
| D (comparative) | Batch 1 + 400 ppm BTA | 2639 | 203 |
| E (inventive) | Batch 1 + 400 ppm BTA + 0.5 wt. % CsCl | 218 | 133 |
| F (control) | Base composition (batch 2) | 2098 | 488 |
| G (inventive) | Batch 2 + 30 mM CsCl | 237 | 461 |
| H (comparative) | Batch 2 + 30 mM Cs$_2$CO$_3$ | 2052 | 530 |
| I (inventive) | Batch 2 + 30 mM KCl | 185 | 506 |

As is apparent from the results set forth in Table 4, all compositions which contained chloride anions (Compositions C, E, G, and I) had copper removal rates of 5 to 10 times lower than the respective chloride-free compositions (Compositions B, D, F, and F, respectively). The tantalum removal rate generally was not affected by the presence of the chloride anions. The presence of other types of anions, such as CO$_3^{2-}$ (Composition H), did not affect the copper removal rate. The data set forth in Table 4 also demonstrate that traditional copper inhibitors such as BTA and 1,2,4-triazole did not effectively reduce the copper removal rate (compare Compositions B and D with Composition A).

EXAMPLE 5

This example illustrates the effect on the removal rate of copper by the presence of chloride or bromide anions in a polishing composition comprising fumed alumina and iodate.

Various compositions were evaluated with respect to copper removal rate. Each composition comprised water, 0.5 wt. % fumed alumina, and 0.2 wt. % KIO$_3$, and was adjusted to a pH of 2.2 with nitric acid (the base composition). Various amounts of BTA, potassium chloride, and potassium bromide were added to the base composition to form three series of compositions.

A substrate containing a layer of copper was polished with each of the compositions using a Logitech polisher with a soft Politex pad. The Logitech polisher was set with a 10.3 kPa (1.5 psi) down force, a platen speed of 110 rpm, a carrier speed of 102 rpm, and a composition flow rate of 150 ml/min.

Figure 2:
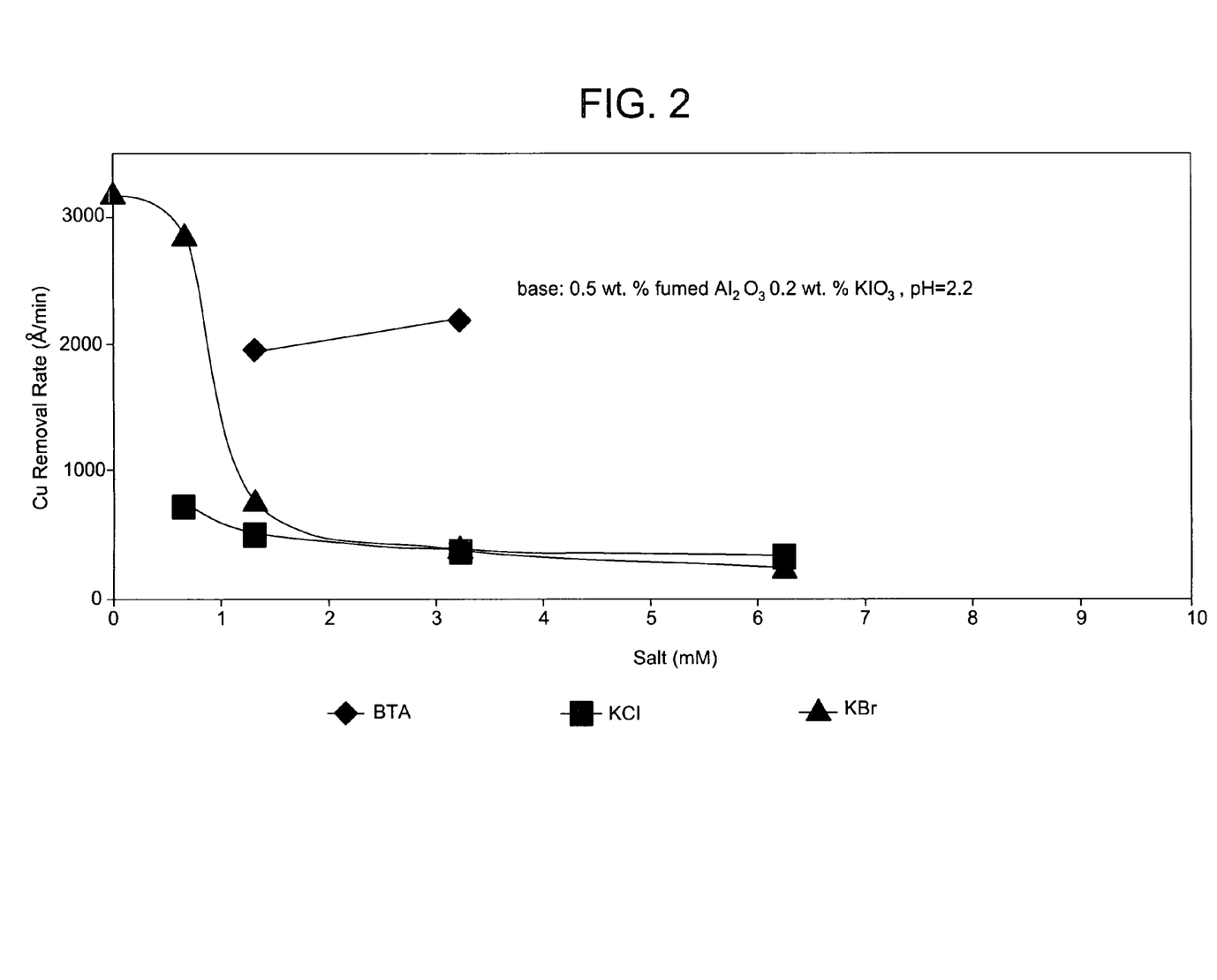
FIG. 2 is a graph of copper removal rate (Å/min) versus salt concentration (mM) for various compositions containing alumina and either BTA, KCl, or KBr at low pH.

The copper removal rate (Å/min) was determined for each composition, and the results are plotted in the graph of FIG. 2.

As is apparent from the data set forth in FIG. 2, the base composition (i.e., with no BTA, KCl, or KBr added thereto) exhibited a high copper removal rate. The BTA-containing series of compositions exhibited high copper removal rates, whereas the series of compositions comprising chloride or bromide anions exhibited reduced copper removal rates.

EXAMPLE 6

This example illustrates the effect on the rate of copper removal by the presence of chloride or bromide anions in a polishing composition comprising fumed silica and iodate.

Various compositions were evaluated with respect to copper removal rates. Each composition comprised water, 0.5 wt. % fumed silica, and 0.2 wt. % KIO$_3$, and was adjusted to a pH of 2.2 with nitric acid (the base composition). Varying amounts of BTA, potassium nitrate, potassium chloride, and potassium bromide were added to the base composition to form four series of polishing compositions.

A substrate containing a layer of copper was polished using a Logitech polisher with a soft Politex pad. The Logitech polisher was set with a 10.3 pKa (1.5 psi) down force, a platen speed of 110 rpm, a carrier speed of 102 rpm, and a composition flow rate of 150 ml/min.

Figure 3:
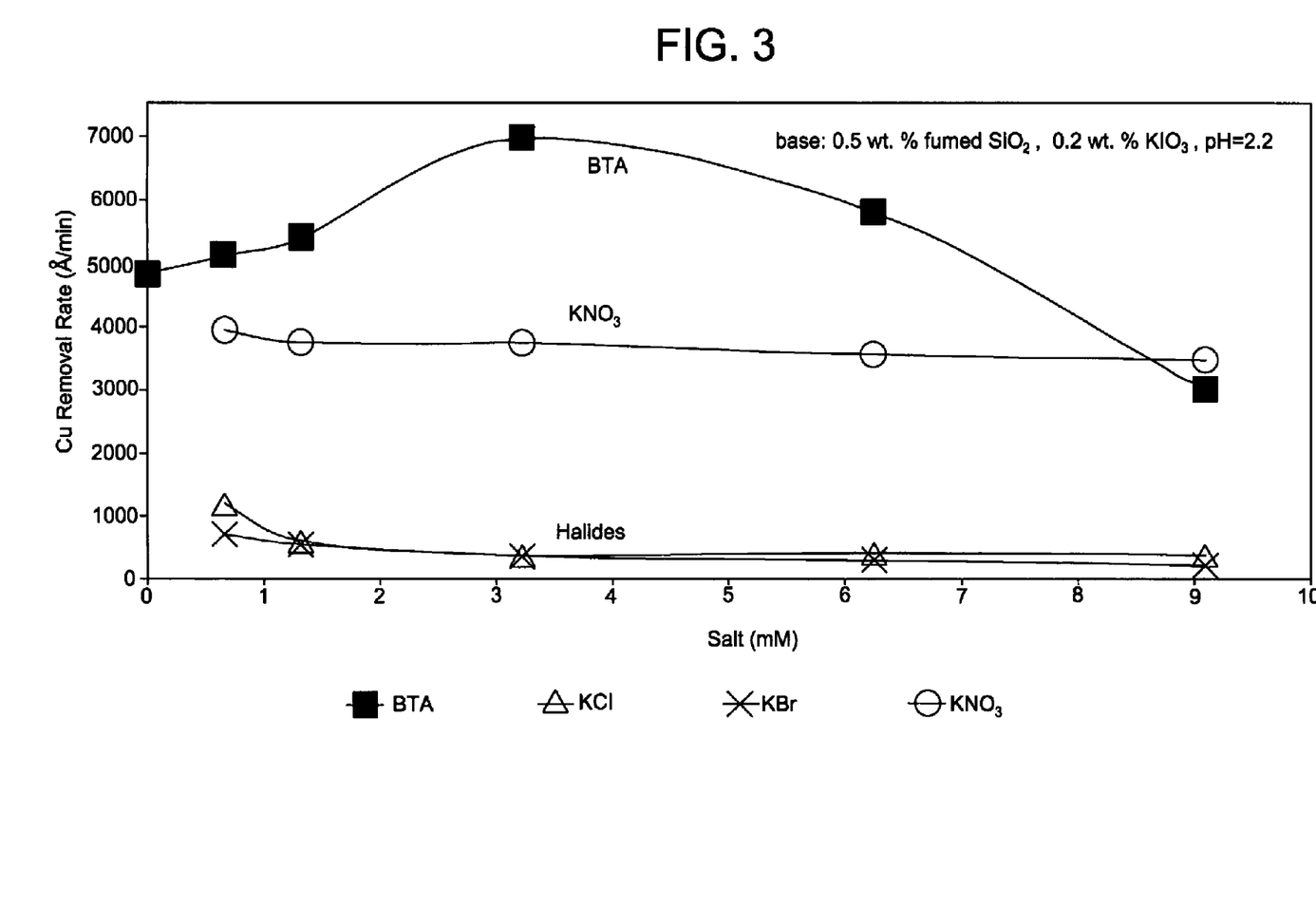
FIG. 3 is a graph of copper removal rate (Å/min) versus salt concentration (mM) for various compositions containing silica and either BTA, KCl, KBr, or $KNO_3$ at low pH.

The copper removal rate (Å/min) was determined for each composition, and the results are plotted in the graph of FIG. 3.

As is apparent from the data set forth in FIG. 3, the base composition (i.e., with no BTA, KNO3, KCl, or KBr added thereto) exhibited high copper removal rates. Both the BTA-containing and $KNO_3$-containing series of compositions exhibited high copper removal rates, whereas the compositions comprising chloride or bromide anions exhibited reduced copper removal rates.

EXAMPLE 7

This example illustrates the effect on the rate of copper removal by the presence of chloride or bromide anions in a polishing composition comprising fumed silica and hydrogen peroxide.

Various compositions were evaluated with respect to copper removal rate. Each composition comprised water, 0.5 wt. % fumed silica, and 0.5 wt. % $H_2O_2$, and was adjusted to a pH of 2.2 with nitric acid (the base composition). Varying amounts of BTA, potassium chloride, and potassium bromide were added to the base composition to form three series of compositions.

A substrate containing a layer of copper was polished using a Logitech polisher with a soft Politex pad. The Logitech polisher was set with a 10.3 kPa (1.5 psi) down force, a platen speed of 110 rpm, a carrier speed of 102 rpm, and a composition flow rate of 150 ml/min.

Figure 4:
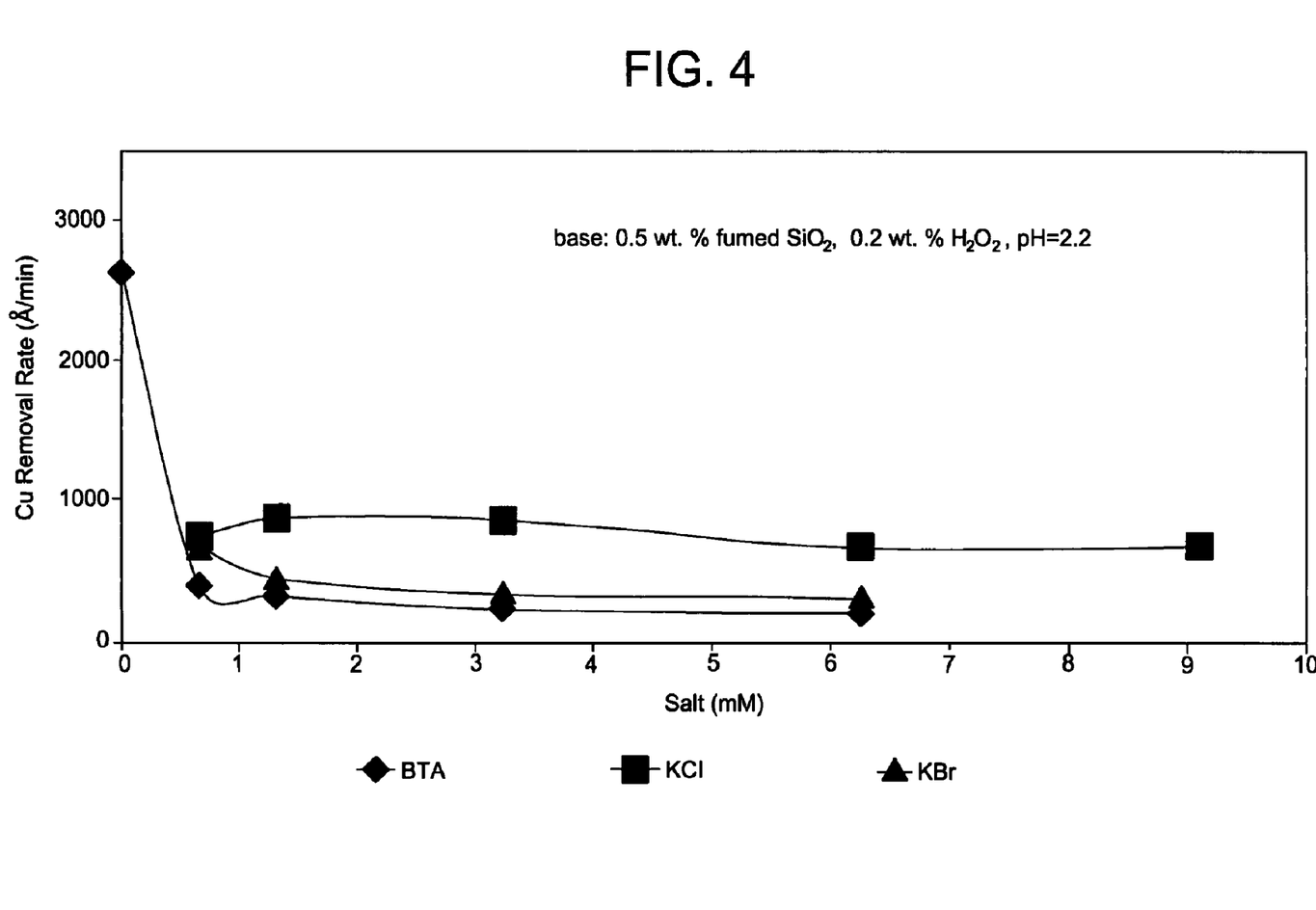
FIG. 4 is a graph of copper removal rate (Å/min) versus salt concentration (mM) for various compositions containing silica and hydrogen peroxide and either BTA, KCl, or KBr at low pH.

The copper removal rate (Å/min) was determined for each composition, and the results are plotted in the graph of FIG. 4.

As is apparent form the data set forth in FIG. 4, the base composition (i.e., with no BTA, KCl, or KBr added thereto) exhibited a high copper removal rate. While the BTA-containing compositions exhibited reduced copper removal rates, the compositions comprising chloride or bromide anions exhibited lower copper removal rates.

EXAMPLE 8

This example illustrates the effect of the pH of the polishing composition on the rate of copper removal.

Various polishing compositions were evaluated with respect to copper removal rates. Each composition comprised water, 0.5 wt. % condensation-polymerized silica (25 nm diameter), and 0.2 wt. % potassium iodate, and was adjusted to a pH of 1.8, 2.2, or 2.6 with nitric acid (the base composition). Varying amounts of BTA, potassium bromide, potassium chloride, or potassium nitrate were added to the base composition to form four series of compositions.

A substrate containing a layer of copper was polished using a Logitech polisher with a soft Politex pad. The Logitech polisher was set with a 10.3 kPa (1.5 psi) down force, a platen speed of 110 rpm, a carrier speed of 102 rpm, and a composition flow rate of 150 ml/min. The BTA and salts were added to the base composition through an in-line mixing system that was built into the Logitech polisher.

The copper removal rates were determined for each composition, and the results are set forth in Table 5.

TABLE 5

| | Copper Removal Rates (Å/min) | | | | | |
|---|---|---|---|---|---|---|
| | pH = 1.8 | | pH = 2.2 | | pH = 2.6 | |
| | Additive Concentration | | | | | |
| Additive | 1.32 mM | 6.55 mM | 1.32 mM | 6.55 mM | 1.32 mM | 6.55 mM |
| None | 5907 | | 4388 | | 1552 | |
| BTA | 4388 | 7812 | 5560 | 5783 | 2008 | 2097 |
| KBr | 409 | 269 | 629 | 266 | 384 | 297 |
| KCl | 477 | 348 | 356 | 337 | 306 | 170 |
| $KNO_3$ | 3039 | 3135 | 2255 | 4281 | 1610 | 1795 |

The data set forth in Table 5 shows that the copper removal rate was significantly reduced by the presence of chloride or bromide anions at each pH, whereas compositions containing BTA or $KNO_3$ exhibited high copper removal rates at each pH. The copper removal rate of the base composition itself strongly depended on pH. The copper removal rate exhibited by the base composition dropped dramatically at a pH greater than 3. In particular, the copper removal rate was 805 Å/min at a pH of 3.04, 219 Å/min at a pH of 3.44, and 168 Å/min at a pH of 3.84.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A chemical-mechanical polishing system for polishing a substrate comprising:
   (a) a polishing component comprising a silica abrasive,
   (b) a liquid carrier,
   (c) an oxidizing agent that oxidizes at least part of a substrate, wherein the oxidizing agent is an iodate and is present in an amount of about 0.5 wt.% or less based on the weight of the liquid carrier and any components dissolved or suspended therein,
   (d) a halogen anion selected from the group consisting of chloride, bromide, and a combination thereof, wherein the liquid carrier with any components dissolved or suspended therein has a pH of about 3 or less, and
   (e) benzotriazole.

2. The polishing system of claim 1, wherein the liquid carrier comprises water.

3. The polishing system of claim 1, wherein the substrate comprises at least one layer of tantalum and at least one layer of copper.

4. The polishing system of claim 1, wherein the polishing system comprises a silica abrasive suspended in the liquid carrier.

5. The polishing system of claim 4, wherein the abrasive is present in an amount of about 0.1 wt. % to about 10 wt. % based on the weight of the liquid carrier and any components dissolved or suspended therein.

6. The polishing system of claim 4, wherein the abrasive is present in an amount of about 0.5 wt. % or less based on the weight of the liquid carrier and any components dissolved or suspended therein.

7. The polishing system of claim 1, wherein the polishing component comprises a polishing pad and the silica abrasive fixed to the polishing pad.

8. The polishing system of claim 1, wherein the oxidizing agent is present in an amount of about 0.2 wt. % or less based on the weight of the liquid carrier and any components dissolved or suspended therein.

9. The polishing system of claim 1, wherein the oxidizer is potassium iodate.

10. The polishing system of claim 1, wherein the halogen anion is generated by a source selected from the group consisting of an acid chloride or bromide, an alkali metal chloride or bromide, a Group IIIA chloride or bromide, an ammonium or ammonium derivative of a chloride or bromide salt, a transition metal chloride or bromide, and combinations thereof.

11. The polishing system of claim 10, wherein the halogen anion is generated by a source selected from the group consisting of hydrogen chloride, magnesium chloride, calcium chloride, strontium chloride, barium chloride, potassium chloride, cesium chloride, lithium chloride, sodium chloride, rubidium chloride, tetrabutyl ammonium chloride, tetramethyl ammonium chloride, tetraethyl ammonium chloride, tetrapropyl ammonium chloride, alkylbenzyldimethylammonium chloride wherein the alkyl is a $C_1$-$C_{20}$ alkyl, aluminum chloride, gallium chloride, indium chloride, thallium chloride, zinc chloride, copper chloride, ferric chloride, ferrous chloride, tetrabutyl ammonium bromide, tetramethyl ammonium bromide, tetraethyl ammonium bromide, tetrapropyl ammonium bromide, alkylbenzyldimethylammonium bromide wherein the alkyl is a $C_1$-$C_{20}$ alkyl, hydrogen bromide, lithium bromide, potassium bromide, cesium bromide, rubidium bromide, sodium bromide, magnesium bromide, calcium bromide, strontium bromide, barium bromide, aluminum bromide, gallium bromide, indium bromide, thallium bromide, zinc bromide, copper bromide, ferric bromide, ferrous bromide, and combinations thereof.

12. The polishing system of claim 10, wherein the concentration of the halogen anion is about 0.5 mM to about 50 mM.

* * * * *